United States Patent [19]

Durling

[11] 4,030,757

[45] June 21, 1977

[54] TRACTOR-MOUNTED CARGO-TRAILER BRAKE CONTROL SYSTEM

[75] Inventor: Harold Durling, Elsie, Mich.

[73] Assignee: Midland-Ross Corporation, Cleveland, Ohio

[22] Filed: Feb. 17, 1976

[21] Appl. No.: 658,508

[52] U.S. Cl. .............................. 303/28; 137/118; 303/7

[51] Int. Cl.² ...................................... B60T 15/36

[58] Field of Search ............. 303/6 M, 7, 9, 13, 28, 303/29, 30, 71, 84 R; 137/118

[56] References Cited

UNITED STATES PATENTS

| | | | |
|---|---|---|---|
| 3,183,919 | 5/1965 | Herring | 303/29 |
| 3,273,950 | 9/1966 | Vielmo | 303/9 |
| 3,504,946 | 4/1970 | Valentine et al. | 303/9 |
| 3,556,616 | 1/1971 | Hensley | 137/118 X |
| 3,951,463 | 4/1976 | Fannin et al. | 303/7 |

Primary Examiner—George E. A. Halvosa
Attorney, Agent, or Firm—Woodrow W. Portz

[57] ABSTRACT

Disclosed is a positive-pressure air brake system for a highway tractor and trailer combination in which the conventional mode of tractor-to-trailer control line connection is avoided and supplanted by a sub-system in which the trailer control line pressures are developed from the tractor supply line rather than its control line through a valve assembly which responds to tractor control line pressures in relay fashion to dispense brake-operating pressures to the control line of the trailer. This valve assembly is further disclosed as having mechanism for sensing differences in the pressures of the tractor and the trailer control lines, e.g., a difference resulting from the rupture of the trailer control line, to close off the air supply to the trailer and thus bring about emergency application of the trailer brakes without any material loss of pressure in either the supply or control lines of the tractor brake system.

6 Claims, 5 Drawing Figures

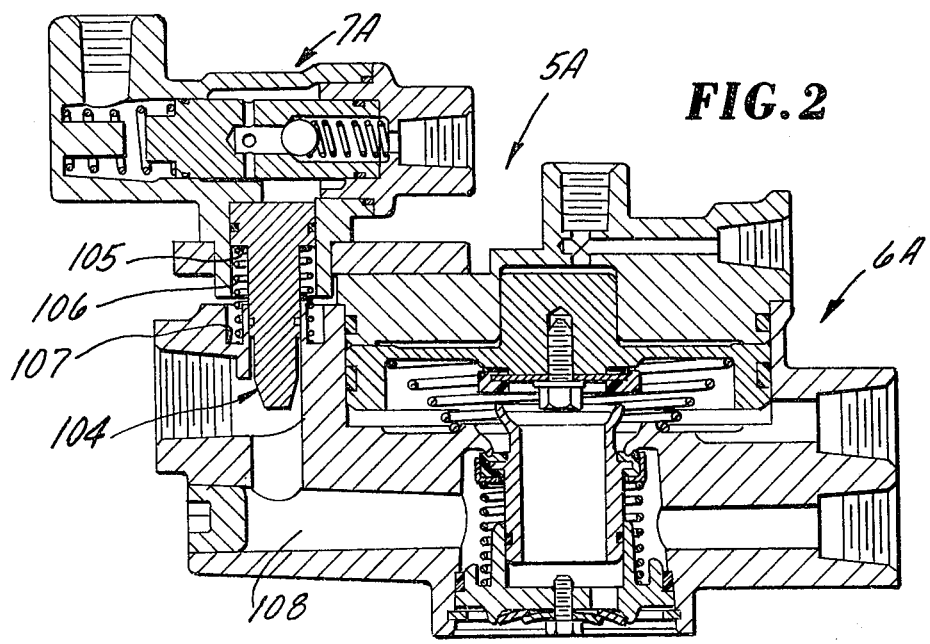
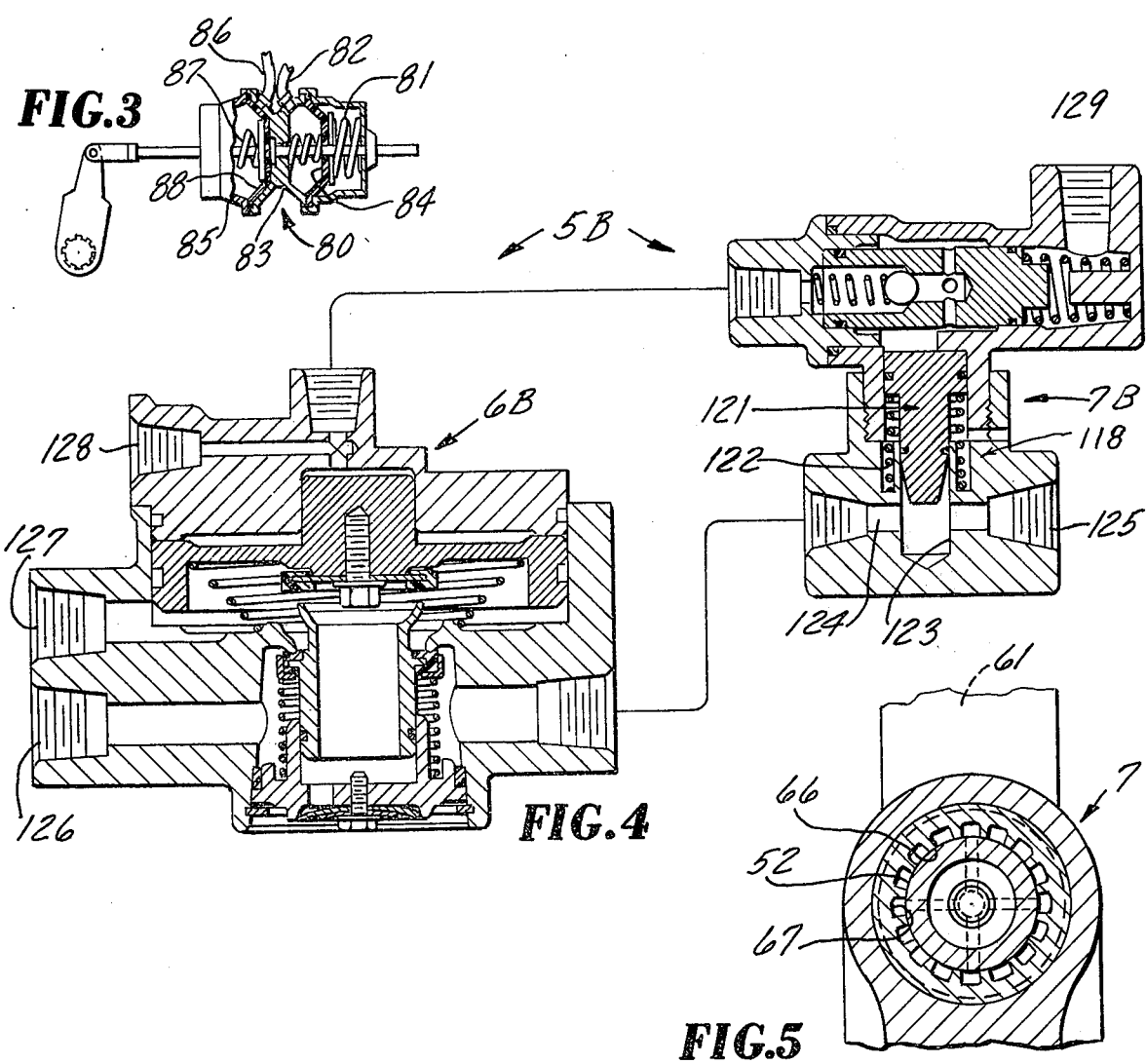

TRACTOR-MOUNTED CARGO-TRAILER BRAKE CONTROL SYSTEM

BACKGROUND OF THE INVENTION

In conventional highway-tractor trailer air brake systems, two lines extend from the tractor to the trailer with the tractor having the basic air pressure generating equipment. One line, usually referred to as a trailer "emergency" or "supply" line, maintains constant maximum pressure in a reserve air reservoir mounted on the trailer supplied from a main air reservoir on the tractor. The other line, commonly known as the "control" or "trailer service" line, is pressurized in response to a brake-operating valve on the tractor. The term "rig" is used herein to refer to a tractor and trailer combination as a unit.

The basic conventional brake arrangement on a trailer requires that the trailer brake system be spring-loaded with sufficient spring strength to apply the brakes and bring the entire rig to a stop whenever air pressure in the air motor opposing the spring force to maintin the brake from application drops to a level allowing the pring force to operate the brakes. To implement this arrangement, a first air motor powered by pressure from the trailer air reservoir and controlled by pressure in the trailer supply line constantly opposes the spring-loaded bias of the trailer brakes to maintain released condition of the brakes while pressure exists in this line. A rupture in the "emergency" or "supply" line from the trailer will thus cause exhaustion of the trailer spring set brake chambers and application of the emergency brakes.

A second air motor responsive to pressure in the "control" line to the trailer is mounted in the trailer to apply the trailer service brakes. In this manner, air pressure in the "control" line induced by operation of a foot pedal or other manual control on the tractor results in trailer brake operation.

In the event of rupture of either or both of the two air lines to the trailer, air pressure on the tractor equipment must be sustained at a sufficient level to operate the tractor brakes. Usually a tractor-trailer brake system includes a valve mounted on the tractor dash known to the trade as a "tractor protection control" valve for supplying fluid to a "tractor protection valve" which forwards fluid to the trailer through the trailer "emergency" or "supply" line and opens the trailer "control" line. This valve is manually operated and once opened is held open by pressure in the portion of the emergency line extending to the trailer. Rupture of this line causes no great air loss to the tractor as the valve senses the loss of line pressure and shuts promptly before much leakage to preserve the braking ability of the tractor.

When the "service" or "control" line from the conventionally equipped tractor to the trailer ruptures, a massive air leak occurs when the truck operator attempts to brake the rig and the trailer brakes are prevented from applying because no signal can be transmitted to the trailer.

Leakage will occur until exhaustion of the truck reservoir occurs, or until the "tractor protection control" valve shuts off air flow to the "tractor protection" valve. This vents the trailer supply line, usually after the pressure has dropped to around 40 psi with consequent degrading of tractor brake performance. Meanwhile the trailer brakes do not function until this automatic shut off occurs.

Hence, it is an object of this invention to provide a tractor-trailer brake system in which the tractor brakes remain fully in service after any failure to brake lines between the tractor and the trailer.

It is another object to provide a brake system for bringing the emergency brake on the trailer into operation when the control line thereto fails without substantial pressure loss on the tractor system.

Another object is that, if one of the control lines to the trailer has ruptured and an emergency stop has been made, the entire tractor-trailer brake system will function in a manner to release the trailer brakes and allow movement of the rig to service facilities.

SUMMARY OF THE INVENTION

This invention resides in a highway tractor-trailer brake system requiring a conventional positive-pressure brake system for the tractor including an air pressure source mounted thereon, a control line for distributing air pressures to the various air motors of the brake actuators, and a normally-closed self-venting manually-operated brake-actuation valve, normally foot operated, included in the control line between the pressure source and the actuators. The invention is applicable to trailer brake systems in which the actuators comprise springs which constantly act on the trailer brakes to urge brake application, brake-releasing air motors for normally overriding the springs except for an accidental conditional or parking, and brake-applying air motors for bringing about a service brake application.

The innovative aspect of the invention resides in an assembly comprising a tractor protection valve and a pressure-sensing module mounted on the tractor with a supply port connected with a reservoir tank and tractor-mounted air pump or other source by direct supply line, a second port connected with the brake-releasing air motors, a third port connected with the brake-applying motors, and an open passageway between the first and the second ports. The tractor protection valve is constructed with a reciprocal throttle element adjacent the supply port which controls the movement of air along the above named passageway to both the trailer control and supply lines. This element, conveniently in the form of a piston, is normally acted upon at one end by the pressure in the supply line to maintain the passageway open, and in the other direction by pressure from the tractor control line applied to its other end by movement of air around the piston of a pressure-sensing module which measures the difference between the pressure of the tractor control line and that of the trailer control line.

Brake application pressure in the trailer control line is developed indirectly by a portion of the tractor protection valve pressure-sensing module assembly comprising relay cylinder-piston mechanism wherein the pressure from the tractor control line is applied to a spring-return piston which is pressured against its spring loading to open a disc valve allowing air to escape from the passageway of the tractor protection valve into the trailer control or service line.

When the trailer service or control line is ruptured, the heretofore balanced pressure condition in the pressure sensing mechanism is terminated allowing the presssure of the tractor control line to dominate and cause the pressure sensing module to apply pressure to the throttle element adjacent the supply port. In this manner, supply air from the tractor to the trailer is shut off. Under this condition, the relay piston of the tractor protection valve will hold the disc valve open to allow air from the supply line to pass by it into the third port and out the ruptured control line to exhaust the brake-release air motors and allow emergency application of the trailer brakes by the actuator springs.

Reduction of pressure in the tractor control line by release of the brake pedal restores equilibrium in the pressure sensing module whereby the throttle element retracts to allow pressure to again be built up in the trailer supply line to bring about a release of the trailer brakes. The operator is thus temporarily allowed to move his rig to a place of safety.

While the direct air supply line from the tractor to the trailer passes through the valve assembly of this invention, damming or sealing off the tractor air aupply line upon rupture of the supply line to the trailer is accomplished in the conventional manner by a tractor mounted trailer supply valve, known also to the trade as a "tractor protection control valve", usually mounted on the dash panel of the tractor. A special construction feature of this valve is that, when the pressure in the supply line to the valve drops to a preselected pressure, such as 50 psi, pressure no longer holds the valve open and a compression spring automatically closes the valve to a position at which pressure restored to normal level in the tractor supply line will not open the valve without manual assistance.

Hence, the assembly comprising the tractor protection valve and the pressure sensing module automatically covers emergency failures in the trailer control line system without material effect on the tractor air systems whereby emergency failures in the trailer air supply system are administered automatically by the trailer supply valve in combination with the tractor protection valve. These emergency pressure-control mechanisms become operative also during "bobtailed", i.e., trailer-detached, operation of the tractor.

BRIEF DESCRIPTION OF THE DRAWING

FIG. 2 is a longitudinal axial view of a modified assembly of a tractor protection valve and a pressure sensing module.

FIG. 3 is a view partly in section of trailer brake actuating mechanism.

FIG. 4 is a longitudinal axial view of a modified assembly of a tractor protection valve and a pressure-sensing module.

FIG. 5 is a fragmentary cross section taken in the pressure-sensing module along line V—V of FIG. 1.

DESCRIPTION OF PREFERRED EMBODIMENTS

First Embodiment

Figure 1:
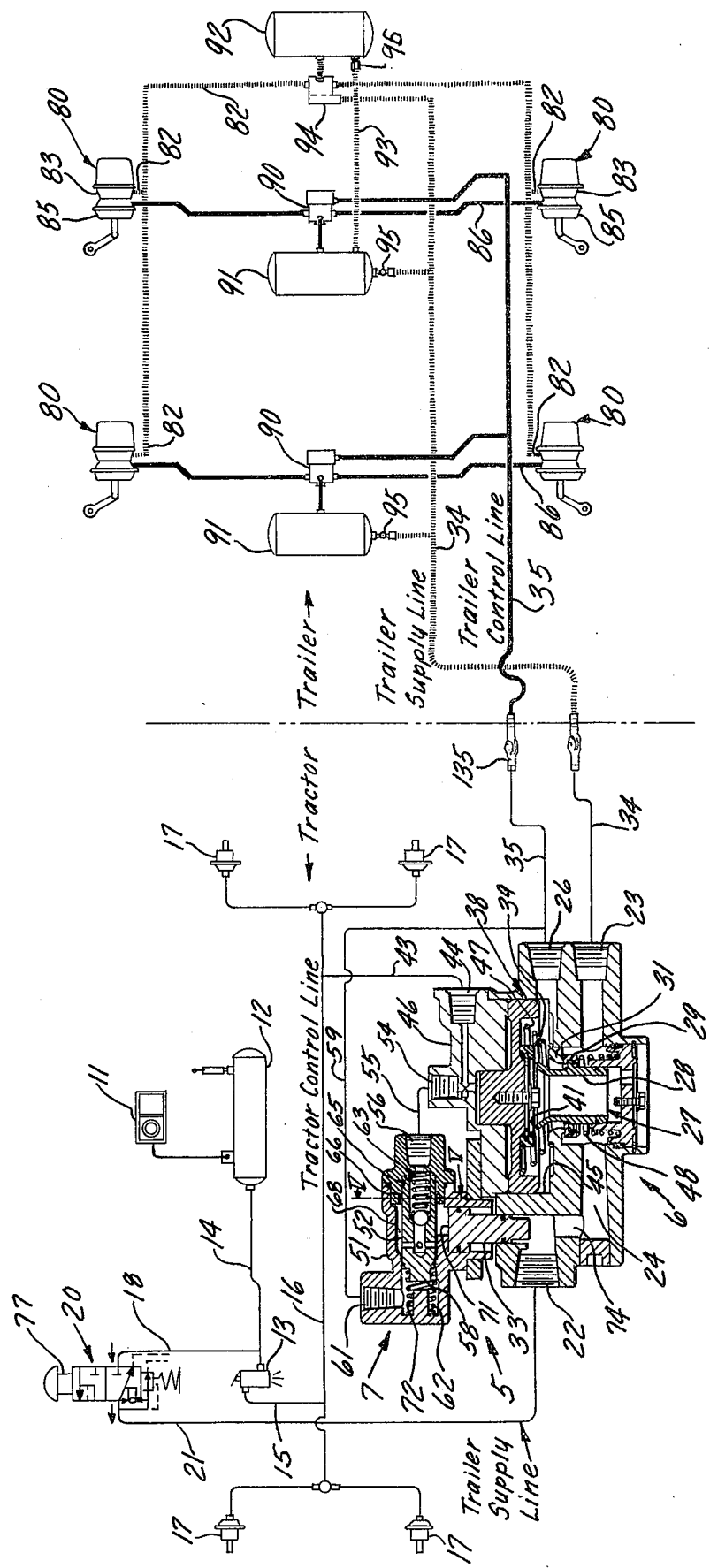
FIG. 1 portrays the brake system of a highway tractor and trailer combination partially in diagrammatic view with respect to the general aspects of the system and in longitudinal and axial cross section with respect to an assembly comprising a tractor protection valve and pressure-sensing module.

The highway tractor-trailer pressure brake system of FIG. 1 is exemplary in its major aspects of a modern braking arrangement except for the assembly 5 comprising a tractor protection valve 6 and a pressure-sensing module 7 rigidly attached to the valve 6. Other elements of the braking system include a compressor 11 for supplying air under pressure to a supply reservoir 12, a brake actuation valve 13 connected with the supply reservoir by line 14 and by line 15 to the tractor control line 16. Use of the valve 13, usually foot operated, causes the truck brake actuators 17 to apply the truck brakes through air pressure transmitted to the actuators through line 16 in accordance with the extent of pedal depression. The valve 13 is constructed to release pressure in the line 16 incrementally to the extent that it approaches its full brake release position.

The tractor protection valve 6 is supplied with air independently of the tractor control line 16 from the supply reservoir 12 through a line 18 joining in its downstream direction with a trailer supply valve 20 which delivers air into a supply line 21 connecting by its downstream terminous with a first or supply port 22 of the tractor protection valve 6. Port 22 is connected with a second or delivery port 23 by an internal passageway 24 of the valve 6. The body of valve 6 has a third or trailer control line port 26 which receives air from the passageway 24 for pressurizing the trailer control or service system when a disc valve 27 comprising a tube portion 28 and a flange portion 29, is unseated with its flange portion 29 out of engagement with an annular seat 31.

Except for emergency positioning of a pressure sensitive throttle element or pistion 33, the tractor mounted supply line 21 is in continuously open communicating relation with the trailer air supply line 34 extending from port 23. Whenever operating pressures exist within the passageway 24, air pressure for actuating the trailer brakes may be supplied through a trailer control line 35 through an opening of the valve 27 resulting from such movement of a relay piston 38 as to bring a ring 39 thereof into engagement with an end edge 41 of the tubular portion of valve 27 and to unseat its flange portion 29 from the seat 31. Movement of the piston 38 toward the valve 27 is initiated by an opening of the tractor mounted brake actuation valve 13, and transmission of the resulting rise in pressure through the control line 16, a line 43, and a port 44 of the body of the valve 6 in communication with the side of piston 38 facing away from the valve 27. The piston 38 moves within a cylinder enclosed by valve body wall 45 and a cylinder head 46. The piston 38 is returned in the absence of pressure toward the cylinder head 46 by a spring 47. The valve 27 is urged toward its seat 31 by a spring 48.

The pressure sensing module 7 comprises a housing 51 defining a cylinder for a piston 52. One end (the right end as seen in FIG. 1) of piston 52 is exposed to air pressure existing in the tractor control line 16 through line 43, a port 54 in communication with port 44, a line 55, and the module port 56 which opens into the corresponding end of this module cylinder. The other end 58 of the piston 52 is exposed to air pressure from the tractor-to-trailer control line 35 through a line 59 leading from line 35 to module port 61. Normally, the pressures at both ends of the piston 52 balance out and a spring 62 seats the piston against the cylinder end surface 63 at its normal position.

Whens there is higher pressure in the tractor control line 16 than in the trailer control line 35, the piston 52 moves to the left as viewed in FIG. 1 until seal rings 65 of the piston 52 are radially opposite the flutes 66 and grooves 67 more plainly shown in FIG. 5. At this position of the piston, some air leaks from the line 16 through the port 56 past the piston head into annular region 68 to act on surface 71 of the throttle piston 33. The piston 52 normally moves further toward the port 61 until end surface 58 seats against a projection 72. Under the resulting pressure in region 68, the piston 33 moves into a portion 74 of the passageway 24 to close off any passage of air from supply line 21 into the passageway 24.

The piston 33 is positioned for reacting to differences in the pressures applied to its opposite ends. As the pressure applied to surface 71 from the module 7 will normally be less than that in the passageway 24 at the time shut-off of the supply line 21 is required, the end surface 71 of piston 33 is substantially greater than the pressure area at the other end of piston 33 subject to pressure from the line 21.

Referring again to FIG. 1, the lines 18 and 21 for supplying air to the trailer through the tractor protection valve 6 directly from the tractor-mounted supply reservoir 12 include a tractor-mounted trailer supply valve 20. The valve 20 is normally mounted within easy reach of the tractor operator, e.g., on the dash panel of the tractor, and is typified by a valve illustrated and described in a "Technical Data Bulletin No. 16-3" dated June 1965 of the Bendix-Westinghouse Automotive Air Brake Company of Elyria, Ohio, identified as "PP3 Control Valve". This valve is actuated on a push and pull basis by a plunger 77 which occupies an outwardly extended position relative to the valve body when the valve is closed as indicated in FIG. 1. At closed position of valve 20, the entire portion of the supply line extending downstream therefrom to the trailer is vented.

To obtain the open condition of the valve, the plunger 77 is pushed inwardly of the valve body to allow communication of lines 18,21 and passage of air through tractor protection valve 6 to the trailer. A special feature of the valve is when the pressure in the supply line 21 drops to a preselected pressure, such as 50 pounds per square inch (psi), the plunger will move to its valve-closed position under urging of a compression spring as the spring pressue overcomes degenerating line pressure acting on a disc valve element carried by the plunger to hold the valve open. Another feature is that the valve comprises tripper exhaust mechanism held closed by any preselected pressure, such as 30 psi, in the delivery line 21 lower than that level of degenerated pressure, e.g., 50 psi, which causes movement of the plunger to its valve-closed position. The purpose of the low pressure-operated tripper exhaust mechanism is to vent the trailer supply pressure system and thus forestall the efforts of a tractor operator to move the rig after the supply pressure for the tractor has degenerated to an unsafe pressure range at which actuation of the tripper exhaust mechanism will occur.

Also shown in FIG. 1 is a typical modern-day trailer-brake control apparatus for a two axle trailer comprising four spring-loaded actuators 80 arranged interiorly as generally shown in FIG. 3. In the absence of other forces, spring 81 of each actuator will urge the brakes into operation with sufficient force to quickly decelerate a highway rig. The brakes are normally held released by "supply" pressure communicated through lines 82 to effect such movement of the diaphragm 84 of each actuator as to place the spring 81 in a shortened condition of compression. At "release" condition, a spring 87 of the air motor 85, weaker than spring 81, acts on diaphragms 88 to maintain it in the position shown in FIG. 3, the central rods of both air motors are separable within the common junction wall of the motors adjacent the diaphragm 88. With the brakes thus released, air pressure may be supplied to the air motor 85 through control line 86 to achieve brake operation.

In the trailer brake arrangement of FIG. 1, signals to operate trailer brakes are transmitted through line 35 to relay valves 90 which in turn distribute air to air motors 85 of the actuators through line 86. The air used for actuation of the air motors 85 is drawn from primary reservoir tanks 91 since lines 35 are merely signal lines to the valves 90.

A secondary reservoir 92 having its pressure maintained from one of the primary reservoirs by a line, such as line 93, forwards air to the brake releasing motors 83 of the actuators 80 through lines 82. The air supplied to the relay valve 94 through line 34 is merely signal pressure. To further insure the operation of motors 83 to maintain the brakes released upon failure of a source of pressure, i.e., tank 91, for the secondary tank 92, the tanks 91 are equipped with valves 95 which in one function act as check valves through which no air can return to the line 34 from tanks 91 but operate to pass air from the line 34 to the tanks 91 above a nominal pressure, such as 60 psi. By this arrangement, reduction of the tractor air supply pressure below 60 psi can be avoided, and an air supply is trapped in the secondary tank 92 by check valve 96 in line 93 which can maintain the pressure in the brake-release air motors 83 for an indefinite time.

Second Embodiment

FIG. 2 illustrates an assembly 5A which comprises a pressure sensitive module 7A and a tractor protection valve 6A. Assembly 5A resembles closely assembly 5 except for detail of the module 7A. As a feature of assembly 5A, the throttle piston 104 provides a shoulder 105 providing a spring seat for spring 106. Another seat for this spring is provided as the bottom 107 of an annular recess in the body of the tractor protection valve 6A. The spring 106 urges the piston 104 to retracted position for maintaining the main supply passageway 108 through the valve body open. The lower end of piston 104 is conical. As piston 104 is driven downward, the air flow through passage 108 is progressively restricted. This progressive action allows a modulation or control of the trailer emergency brakes rather than a simple on/off type of operation.

Third Embodiment

FIG. 4 illustrates an assembly 5B comprising a tractor protection valve 6B and a pressure-sensing module 7B of which components of the assembly may be found in the previously described embodiments but are differently distributed between the valve 6B and the module 7B. The essential difference between assembly 5B and assemblies 5 and 5A is that the main supply passageway throttling mechanism indicated generally by numeral 118 and included in the previously described embodiments with the tractor protection valve, has been detached from tractor protection valve 6B and included as a portion of the module 7B. To be observed in module 7B is a throttle piston 121 movable against a spring 122, similar to spring 106 of the second embodiment. The piston 121 is movable lengthwise of the bore 123 to close off a passageway 124 having a port 125 in which main tractor supply line 21 would terminate. Ports 126,127 have the same function as ports 23,26, respectively, of the first embodiment. Ports 128,129 have the same function as ports 44, 61, respectively, of the first embodiment.

OPERATION

Referring now to FIG. 1 and assuming the plunger 77 of the dash mounted trailer supply valve 20 to be pushed inwardly to its valve-open position, air is supplied through line 21, the passageway 24 of the tractor protection valve to the trailer supply system including the primary tanks 91 and the secondary tank 92 since valve 6 does not ordinarily restrict supply air to the trailer. When the vehicle operator makes a brake application, pressurized air from the brake actuation valve 13 applies the tractor brakes and also enters ports 44 of the tractor protection valve to actuate the relay mechanism. That is to say, this signal drives the relay piston 38 toward the disc valve 27 to unseat the flange 29 thereof from its seat 31. Pressurized air flows through the resulting gap and out the port 26 into the trailer control line 35 to relay valves 90 of the trailer. The relay valves operate to release air from the primary tanks 91 into the actuator motors 85 whereupon the trailer brakes are applied. During brake application, the pressure in the trailer control line system, e.g., line 35, is equal to the pressure in the tractor control line system, e.g., line 16, hence ports 56, 61 of the pressure sensing module receive substantially equal pressure signals, and the module remains inactive in the condition shown in FIG. 1.

The unique function of the module and valve assembly 5 becomes evident when a failure develops in the control or service line system of the trailer rearwardly beyond the quick disconnect coupling 135. Assuming a ruptured trailer control line in the conventional brake system of a rig, massive leakage at the rupture occurs when actuation of a valve, such as valve 13, is used in brake application. The resulting loss of pressure in the conventional tractor protection valve results in such reduction in the pressure in the tractor control line as to degrade tractor brake performance. In addition, the trailer receives no signal and the brakes remain unapplied.

When a rupture in the trailer control line 35 in the system of FIG. 1 occurs, the tractor brake system suffers no noticeable loss of pressure and the trailer brakes are operable for emergency use until the rupture can be repaired. With a large leak present in the trailer control line system, operation of actuation valve 13 presssurizes line 16 and ports 44, 54 and 56 of the module-valve assembly 5. The relay piston 38 moves to open the valve 27 and allows air to pass from the pasageway 24 through the port 26 and out the rupture in line 35. The pressure at module port 56 is unopposed by the pressure at port 61 corresponding to the now reduced pressure in line 35. This imbalance drives the module piston 52 to the left as viewed in FIG. 1. Air flows from the tractor control line 16 and line 55 and around the end of the piston as its right end moves into registry with the fluted section of the cylinder comprising ridges 66 and grooves 67 (see FIG. 5). Pressure communicated by the region 68 moves the throttle piston 33 into the opening 74 to shut off supply air from the tractor. Air loss from the tractor is thus stopped, but in addition, air is drained from the trailer supply line 34 and the relay valve 94 which in turn bleeds the trailer actuator brake-release motors 83 to allow spring application of the trailer brakes. This all happens because pressure has been relieved in the supply line 34 through the valve 6 and to the atmosphere through a rupture in control line 35. When the actuation valve 13 in the tractor is released, this valve vents the control line 16 and pressure is relieved on the relay piston 38 and on the right end of the module piston 52 adjacent the module port 56. The throttle piston 33 retracts under urging of the supply pressure in line 21 to establish pressure again in passageway 24. However, the relay valve 27 now closes and pressure is again established in the trailer supply line 34 to inflate again the motors 82 with consequent release of the trailer brakes. While the rig operator is able to continue brake operation of the rig on this basis, damage to the system is indicated by a slowness of response in the operation of the trailer brakes and by a warning light (not shown) in the tractor cab which indicates loss of pressure in the trailer control line system on use of the brake actuation valve 13.

A rupture in the trailer air supply line 34 is sensed and the flow of air thereto terminated by the valve 20 as hereinbefore described. Such a rupture has no effect on the module 7 since the pressures in control line 16 and 35 are not effected. Serious loss of pressure in line 34 results in a corresponding loss of the pressure in actuator motors 83 through the relay valve 94 with that valve acting to dump air from these motors through lines 82. Such a leak will usually be indicated by a gradual application of the trailer brakes.

What is claimed is:

1. A positive-pressure air-brake system for activating brake actuators of a tractor and a trailer connected thereto comprising:
    an air pressure source mounted on a tractor;
    a first control line from said source to said actuators of the tractor;
    normally-closed brake-actuation valve means in said control line having mechanism for venting the downstream portion of said control line at closed position;
    said trailer brake-actuators comprising spring means acting on the trailer brakes for parking and emergency brake actuation, first air-motor means for overriding said spring means to maintain the brakes in released condition, second-air motor means for applying the trailer brakes for normal stops;
    a tractor protection valve having a first port connected by a direct supply line with said source, a second port connected with said first motor means, a third port connected with said second motor means, and a normally open passageway between said first port and said second port;
    said protection valve comprising pressure-sensitive throttle means for closing said first port, second spring-loaded normally-closed valve means openable to place said passageway in fluid communication with said third port, a spring-return reciprocable wall of an expansible chamber engageable with the second valve means on expansion of the chamber to open the second valve means, said expansible chamber being connected on the side of said wall away from said second valve means in fluid communication with said first control line at a point thereon downstream from said brake actuation valve means;
    differential pressure-sensing means connected in fluid communication with said first control line at a point downstream from said brake actuation valve means, and with said third port to measure the difference in fluid pressure therebetween, said differential-pressure sensing means being constructed to communicate fluid pressure from said first control line to said throttle means to close said passageway when the pressure in said first control line is greater than that at said third port, said throttle means being responsive to greater pressure communicated from said source than in said first control line to open said passageway.

2. The air brake system of claim 1 wherein:
said throttle means is a piston-cylinder combination wherein the piston thereof has one end exposed to pressure transmitted thereto from said pressure-sensing means and its other end is exposed to pressure transmitted thereto from said pressure source.

3. The air brake system of claim 2 wherein:
the effective pressure-sensitive area at said one end of said piston is greater than at said other end.

4. The air brake system of claim 1 wherein:
said differential-pressure sensing means comprises a cylinder connected at one end with said first control line and at the other end with said third port, a piston received in said cylinder with resilient means continuously urging the piston toward said one end, said piston has a passageway therethrough for movement of fluid to said one end of said cylinder from the side of said throttle means in communication with said pressure sensing means, and check valve means in said piston passageway; said cylinder comprises fluid by-pass means for communicating pressure from said first control line to said side of said throttle means, said by-pass means becoming exposed and opened after a short movement of said piston from its position adjacent said one end of the cylinder toward the other end.

5. An assembly adapted for mounting on a tractor for the control of brake actuation pressures of a cargo trailer for said tractor, said assembly comprising:
a tractor protection valve comprising a first port, a second port, a third port, and a normally open passageway between the first port and the second port;

said protection valve comprising pressure-sensitive throttle means for closing said first port, spring-loaded normally-closed valve means openable to place said passageway in fluid communication with said third port, a spring-return reciprocable wall of an expansible chamber engageable with said valve means on expansion of the chamber to open said valve means, said expansible chamber having a port on the side of said wall which is away from said valve means adapted for fluid connection with an air-conducting brake-control line of the tractor;

differential-pressure sensing means connected with said third port and adapted for fluid communication with said tractor control line to measure the difference in fluid pressure therebetween, said differential pressure-sensing means being constructed to communicate fluid pressure from externally of the assembly from said tractor control line to said throttle means to close said passageway when said external pressure is greater than that at said third port, said throttle means being responsive to greater pressure communicated to said passageway from another external source than said first external source to open said passageway.

6. The assembly of claim 5 wherein:
said differential-pressure sensing means comprises a cylinder adapted at one end for connection with said tractor control line and at the other end with said third port, a piston received in said cylinder with resilient means continuously urging the piston toward said one end, said piston has a passageway therethrough for movement of fluid to said one end of said cylinder from the side of said throttle means in communication with said pressure sensing means, and check valve means in said piston passageway opposing reverse movement of fluid therethrough; said cylinder comprises fluid by-pass means for communicating pressure from said one cylinder end to said side of said throttle means, said by-pass means becoming exposed and opened after a short movement of said piston from its position adjacent said one end of the cylinder toward the other end.

* * * * *